SECTIONED MOLDED INSULATING EXTINGUISHING UNIT FOR CIRCUIT INTERRUPTER WITH SECTIONS SECURED TOGETHER BY HOT-WIRE TECHNIQUE

Filed Sept. 30, 1960 4 Sheets-Sheet 1

WITNESSES
Robert C. Baird
William A. Elchik

INVENTORS
George B. Cushing
and Carl G. Lentjes.
BY [signature]
ATTORNEY

SECTIONED MOLDED INSULATING EXTINGUISHING UNIT
FOR CIRCUIT INTERRUPTER WITH SECTIONS SECURED
TOGETHER BY HOT-WIRE TECHNIQUE

Filed Sept. 30, 1960 4 Sheets-Sheet 3

SECTIONED MOLDED INSULATING EXTINGUISHING UNIT FOR CIRCUIT INTERRUPTER WITH SECTIONS SECURED TOGETHER BY HOT-WIRE TECHNIQUE

Filed Sept. 30, 1960

United States Patent Office 3,160,728
Patented Dec. 8, 1964

3,160,728

SECTIONED MOLDED INSULATING EXTINGUISHING UNIT FOR CIRCUIT INTERRUPTER WITH SECTIONS SECURED TOGETHER BY HOT-WIRE TECHNIQUE

George B. Cushing, Penn Hills Township, Allegheny County, and Carl G. Lentjes, Churchill, Pa., assignors to Westinghouse Electric Corporation, East Pittsburgh, Pa., a corporation of Pennsylvania Filed Sept. 30, 1960, Ser. No. 59,565
2 Claims. (Cl. 200—150)

This invention relates to circuit interrupters in general, and more particularly to arc-extinguishing structures for circuit interrupters.

A general object of the invention is to provide a circuit breaker embodying an improved arc-extinguishing unit.

In the past, certain circuit interrupter grids or arc-extinguishing units have comprised a plurality of suitably configured insulating fiber plates stacked one on top of the other and bolted or cemented together. These fiber plates were so shaped that, when stacked, two of the opposite ends of each plate cooperated with two similar ends of all of the other plates to form two side walls, and the center portions of the plates formed barriers that extended in form the side wall to form elongated passages in the units. For the most effective arc-extinguishing units embodying many various shaped passages and openings, this type of construction required a considerable number of differently shaped fiber plates. For example, in grids of the type disclosed in the patents to B. P. Baker et al. Patent No. 2,806,111 and to R. E. Friedrich Patent No. 2,900,478, both of which have been assigned to the assignee of the instant application, as many as eleven fiber plates are stacked and secured together to form one unit.

An object of this invention is to provide a circuit breaker embodying an improved arc-extinguishing unit molded in such a way that intricate units of the type disclosed in the above-mentioned patents to B. P. Baker et al. and R. E. Friedrich, can be formed from as few as two sections.

Another object of the invention is to provide an improved arc-extinguishing unit comprising a plurality of sections of novel configuration.

Another object of this invention is to provide an improved arc-extinguishing unit comprising bonded sections with improved means for bonding the sections together.

In the patent application of Gordon C. Gainer and Albert P. Strom, Serial No. 838,332, filed September 4, 1959, now Patent No. 3,059,081 and assigned to the assignee of the instant application, there is taught the broad idea of using a circuit interrupter grid or arc-extinguishing unit molded of a body comprising at least 70% by weight of a high molecular weight polyoxymethylene. The invention described and claimed herein is an improvement upon the foregoing invention.

Accordingly, other objects of the invention are to provide improved arc-extinguishing units in accordance with each of the foregoing objects wherein each of the sections forming the units comprises a body composed of at least 70% by weight of a high molecular weight polyoxymethylene.

Other objects of the invention will be explained fully hereinafter or will be apparent to those skilled in the art.

In accordance with one embodiment of the invention, there is provided an arc-extinguishing unit for a circuit interrupter, which unit comprises a body having oppositely disposed side walls and a plurality of barriers extending between the side walls forming an internal construction of particular intricacy for extinguishing the arc that is formed within the unit during each opening operation of the interrupter. The unit is formed of two symmetrical halves each of which includes one side wall molded integral with one-half of each of the barriers. The halves are secured together by either a cementing operation or by means of pressing them together and passing a hot wire therebetween to form a bond. The halves are molded of a material comprising at least 70% by weight of a high molecular weight polyoxymethylene. The properties of this material are such that when the hot wire passes between the halves, the adjacent surfaces of the material melt, and since the halves are pressed together, the melted material flows around the wire and forms a bond. The high molecular weight polyoxymethylene material has excellent characteristics that will be hereinafter described and that render the material superior for use in arc-extinguishing units.

For a better understanding of the nature and objects of the invention, reference may be had to the following detailed description, taken in conjunction with the accompanying drawings, in which.

Figure 1:
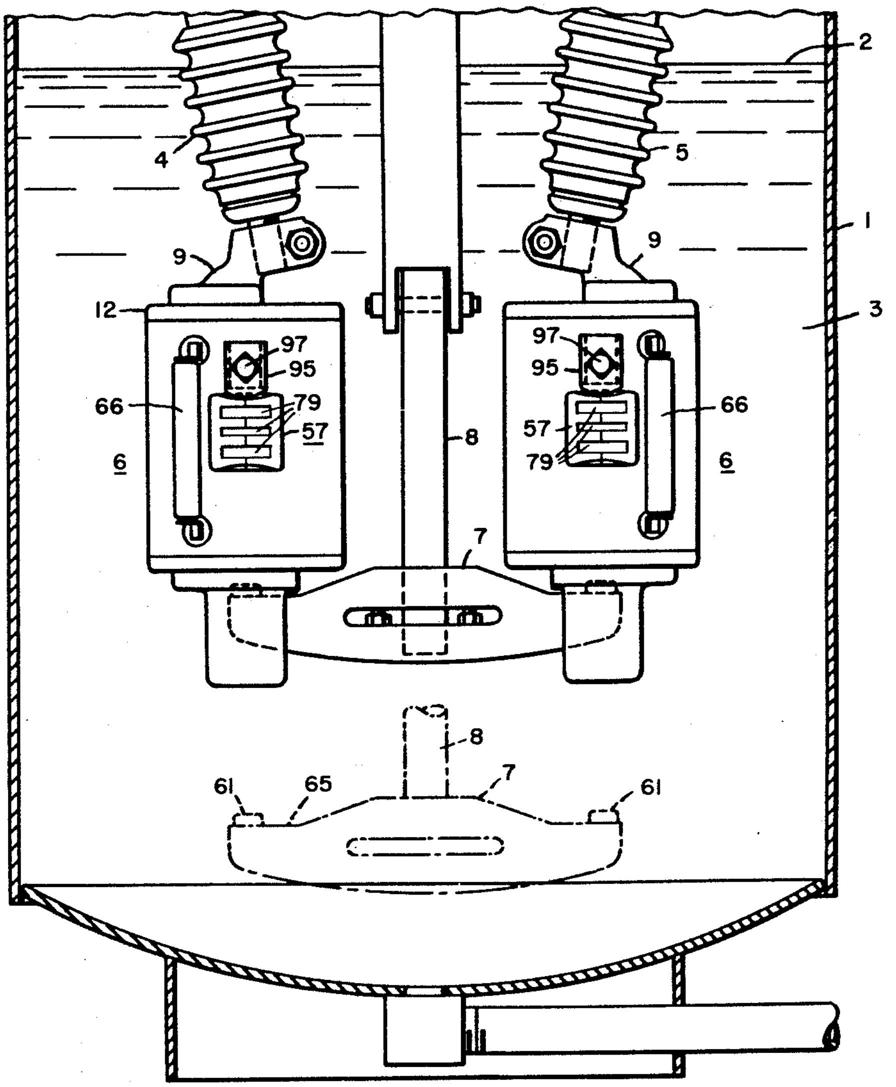
FIGURE 1 is a fragmentary, vertical sectional view through a tank-type, liquid-break circuit interrupter embodying the invention; the contact structure being shown in the closed-circuit position in full lines, and in the open-circuit position in broken lines.

Referring to the drawings and particularly to FIG. 1 thereof, the circuit breaker shown therein is of the type described in the aforementioned patent to R. E. Friedrich, Patent No. 2,900,478. The reference numeral 1 designates a tank filled to the level 2 with a suitable arc-extinguishing fluid 3 which is in this particular instance circuit breaker oil. A pair of terminal bushings 4 and 5 depend from a cover (not shown) and identical arc-extinguishing units 6 are clamped to the lower ends of the bushings 4 and 5. The arc-extinguishing units 6 are electrically connected in the closed-circuit position by a conducting cross-bar 7.

The cross-bar, or bridging member 7 is vertically actuated in a reciprocal manner by means of an insulating lift rod 8, the operation of which may be effected by any suitable operating mechanism (not shown) and specifically forming no part of the invention.

Figure 2:
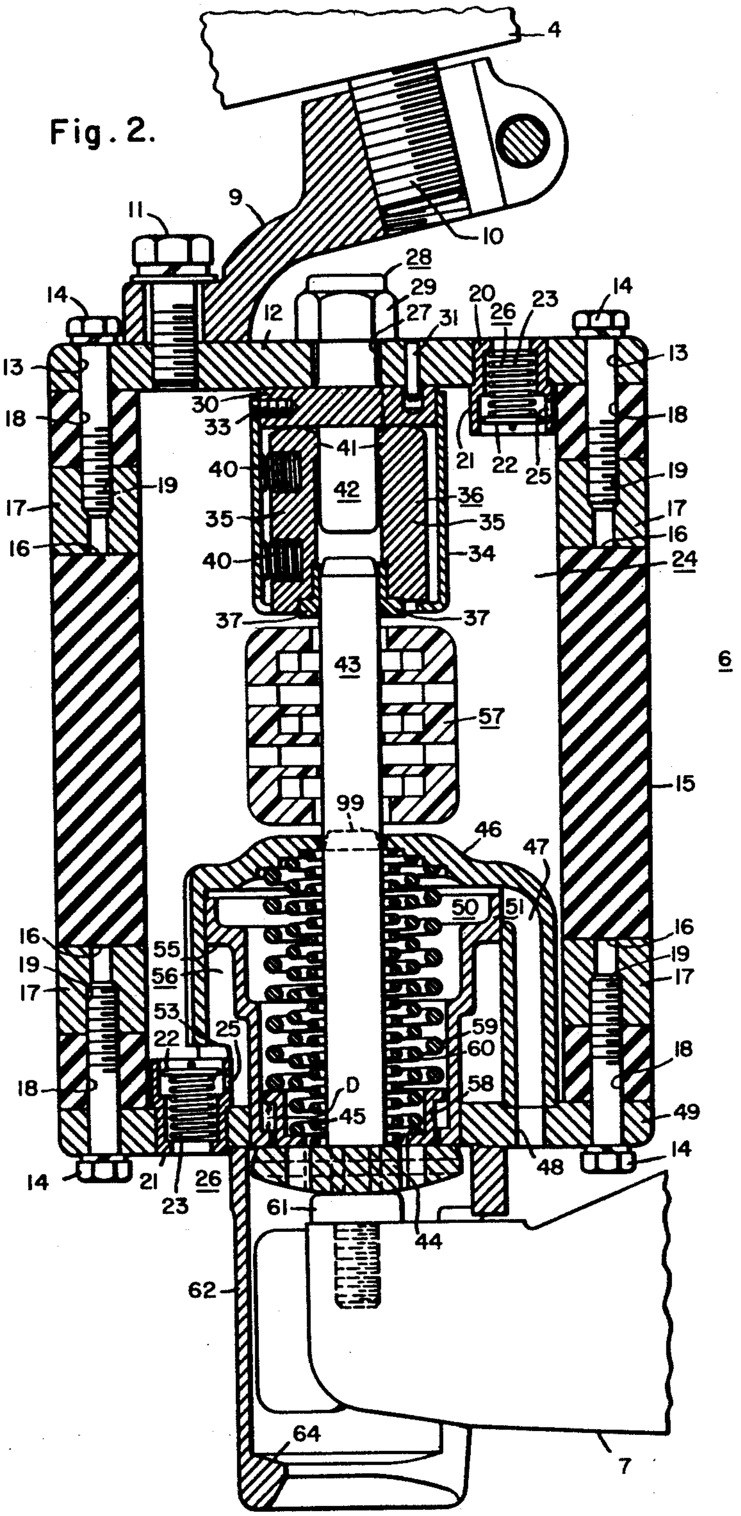
FIG. 2 is an enlarged vertical sectional view taken through the left-hand arc-extinguishing unit of FIG. 1; the contact structure being shown in the closed circuit position.

Referring to FIG. 2, which shows, in an enlarged manner, the internal construction of the left-hand arc-extinguishing unit 6 of FIG. 1, it will be observed that a contact foot 9 is threaded and clamped to the lower end of the terminal stud 10 which extends upwardly within the terminal bushing 4. The contact foot 9 is bolted by three bolts 11, only one of which is shown in FIG. 2, to an upper closure plate 12 of brass or other suitable conducting material. The upper closure plate 12 has a plurality of apertures 13 drilled therethrough in a spaced manner about its circumference. The apertures 13 receive mounting bolts 14 which threadedly secure the closure plate 12 to an insulating tubular casing or shell 15.

A plurality of mounting apertures 16 are drilled through the side wall of the casing 15 near the upper and lower ends thereof. Barrel nuts 17 are inserted within the apertures 16 of the tubular casing 15, and the mounting bolts 14 extend through additional holes 18 drilled longitudinally through the side walls of the casing 15 and terminate in tapped apertures 19 provided in the barrel nuts 17. Thus, the tubular casing 15 is securely attached to the upper closure plate 12.

The upper closure plate 12 also has a plurality of, in this instance three, tapped apertures 20, only one being seen in FIG. 2, within which are threadedly secured valve casings 21 having associated therewith valve discs 22 and compression springs 23 which bias the valve discs 22 to the open position. This permits venting from the interior 24 of the insulating casing 15 through one or more apertures 25 drilled through the side wall of each of the valve casings 21 and through the latter to the region externally of the arc-extinguishing unit 6. There are thus provided a plurality of normally open valves, generally designated by the reference numeral 26 which close during high pressure conditions within the interior 24 of the unit 6. During the interruption process, when high pressure exists within the interior 24 of the casing 15, the several valve discs 22 close against the bias of the several compression springs 23. Controlled venting means is thereby provided at the upper end of the arc-extinguishing unit 6.

An aperture 27 is provided centrally within the upper closure plate 12, and through this aperture extends a contact mounting stud member 28, the upper end of which is threaded and has a mounting nut 29 threaded thereon. The nut 29 clamps a lower flange portion 30 of the stud member 28 against the lower surface of the closure plate 12. A positioning pin 31 may be provided. About the periphery of the flange portion 30 are a plurality of tapped apertures into which thread additional bolts 33 which secure a contact finger casing 34 fixedly in position. A plurality of contact fingers 35, each of which is biased inwardly by means of two compression springs 40, the springs being shown only in the contact finger 35 which is seen to the left in FIG. 2, form a generally tubular contact member indicated generally at 36. Each of the contact fingers 35 has an arc-resisting contact portion 37 attached or brazed thereto. The upper end 41 of each of the contact fingers 35, bears against a depending stud portion 42 which is integral with the contact stud member 28.

A rod-shaped movable contact member 43 cooperates with the relatively stationary contact fingers 35, and has an apertured disc 44 secured to the lower end thereof, which disc serves as a spring seat for a compression spring 45. The upper end of the compression spring 45 seats within a pump cylinder 46. The pump cylinder 46 is cast and contains a plurality of, in this instance three, venting passages or channels 47, only one of which is seen in FIG. 2, which passages lead out at their lower ends through venting apertures 48, provided in the lower closure plate 49, to the region exteriorly of the arc-extinguishing unit 6. The upper ends of the passages 47 lead into an interior region 50 within the pump cylinder 46 through suitable openings. Three openings 53, only one of which is shown in FIG. 2, are provided in the lower end of the pump cylinder 46. The pump cylinder 46 is secured to the lower closure plate 49 by means of a plurality of bolts (not shown).

A pumping piston 55 reciprocally moves within the pump cylinder 46 and forces liquid, in this instance oil, from the region 56 through the three openings 53 and into the interior 24 of the casing 15. This pumped oil enters a grid block or arc-extinguishing unit indicated generally at 57 which will be hereinafter specifically described, to facilitate extinction of the arc established between the contacts 36, 43 during relatively low current values when insufficient pressure for interruption might otherwise exist within the grid block 57.

An annular spring disc 58 is disposed within the piston 55 and, following a predetermined time delay, as indicated by the distance "D" to be traveled, picks up the piston 55 and drives it downwardly thereby giving rise to the aforementioned forced oil flow. The annular spring base 58 serves as a seat for a pair of additional compression springs 59 and 60, the upper ends of which bear against the upper interior end of the pump cylinder 46.

The cross-bar 7 has a contact tip 61 threaded therein, which engages the contact disc 44 and effects closing of the interrupter against the pressure exerted by the several springs 45, 59 and 60. During the opening operation, the cross-bar 7 moves downwardly, permitting the compression springs 45 to bring about rapid unimpeded separation of the contact rod 43 and the several contact fingers 35 establishing an arc therebetween. The spring seat 58 initially moves downwardly with the contact rod 43 because of the biasing action exerted by the compression springs 59, 60. This occurs only during the taking up of the lost-motion afforded by the distance "D," following which time the spring seat 58 picks up the piston 55 and drives the same downwardly. The contact rod 43, however, because of the compression spring 45, moves freely downwardly unimpeded by the spring base 58 or the pumping piston 55.

The downward motion of the contact disc 44 is rapid because of the apertures therethrough and is guided by a contact guide casting 62, which is secured by mounting bolts (not shown) to the lower closure plate 49. The lower closure plate 49, as was the case with the upper closure plate 12, has mounting bolts 14 associated therewith to secure it to the casing 15. The downward opening motion of the lower movable contacts 43 is limited by an inwardly extending flange portion 64 of the contact guide 62. After the lower movable contact 43 has moved downward to a position where the contact disc 44 strikes the flange 64 of the contact guide 62, the conducting cross-bar 7 will continue to move downward to the position designated by the broken lines 65 of FIG. 1, thereby providing an isolating gap between the contact discs 44 and the contact tips 61. This separation between the two contact discs 44 and the two contact tips 61 interrupts the residual current which passes through the shunting resistor tubes 66 (FIG. 1) which shunt the contacts 35, 43 for proper voltage distribution in a manner well known in the art.

A plurality of additional valves 26, in this particular instance three, extend from the lower closure plate 49 and are identical in construction to the valves 26 previously described. These lower valves 26 are disposed at locations in the lower closure plate 49 adjacent the openings 53 as shown in FIG. 2. The lower valves 26 together with the upper valves 26, permit a free flow of oil by convection into the casing 15. This cools the contact structure and ensures a supply of uncontaminated oil for opening operations.

Figure 5:
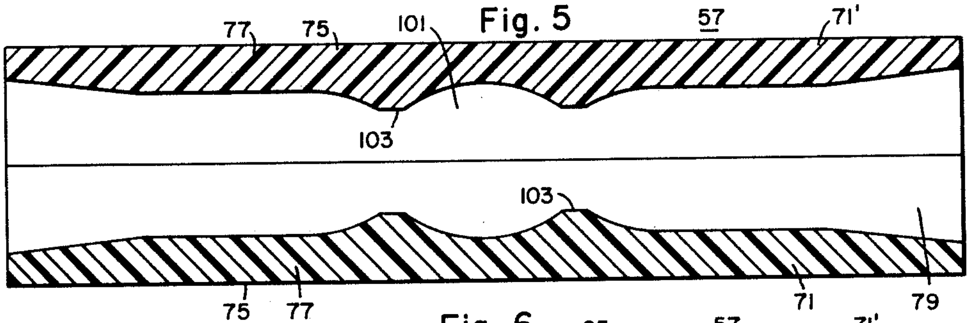
FIGS. 5 to 8 are sectional views taken along lines V—V to VII—VII respectively of FIG. 4.
Figure 6:
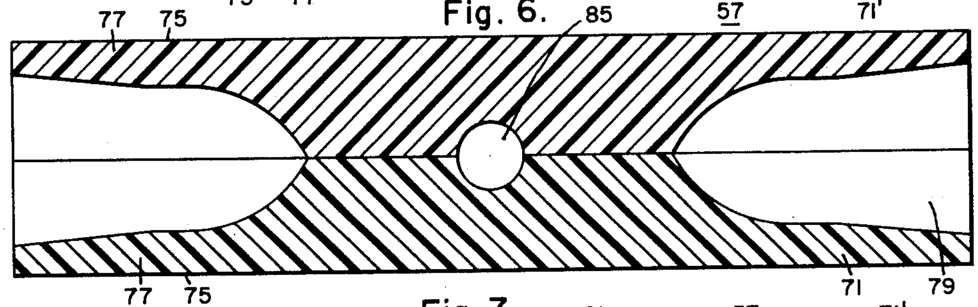
Figure 7:
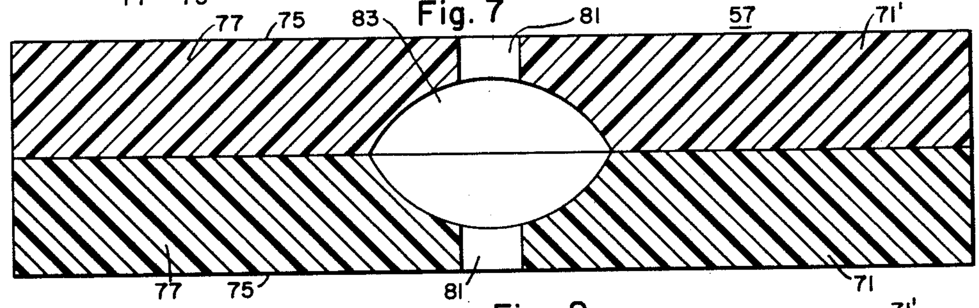
Figure 3:
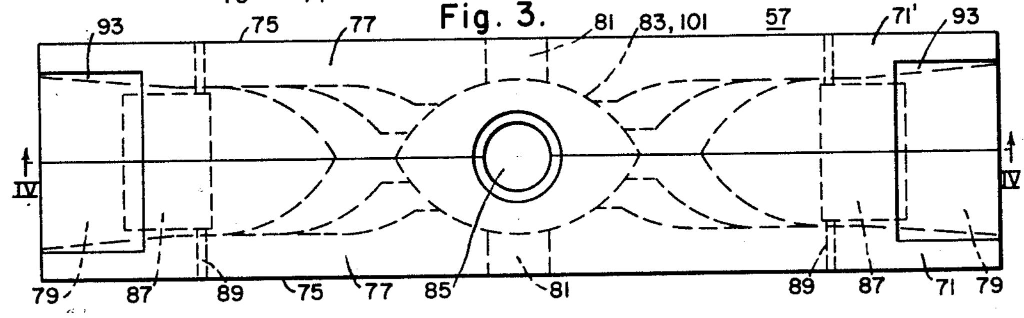
FIG. 3 is a top plan view of one of the arc-extinguishing units of the invention.
Figures 4, 9, 10, 11:
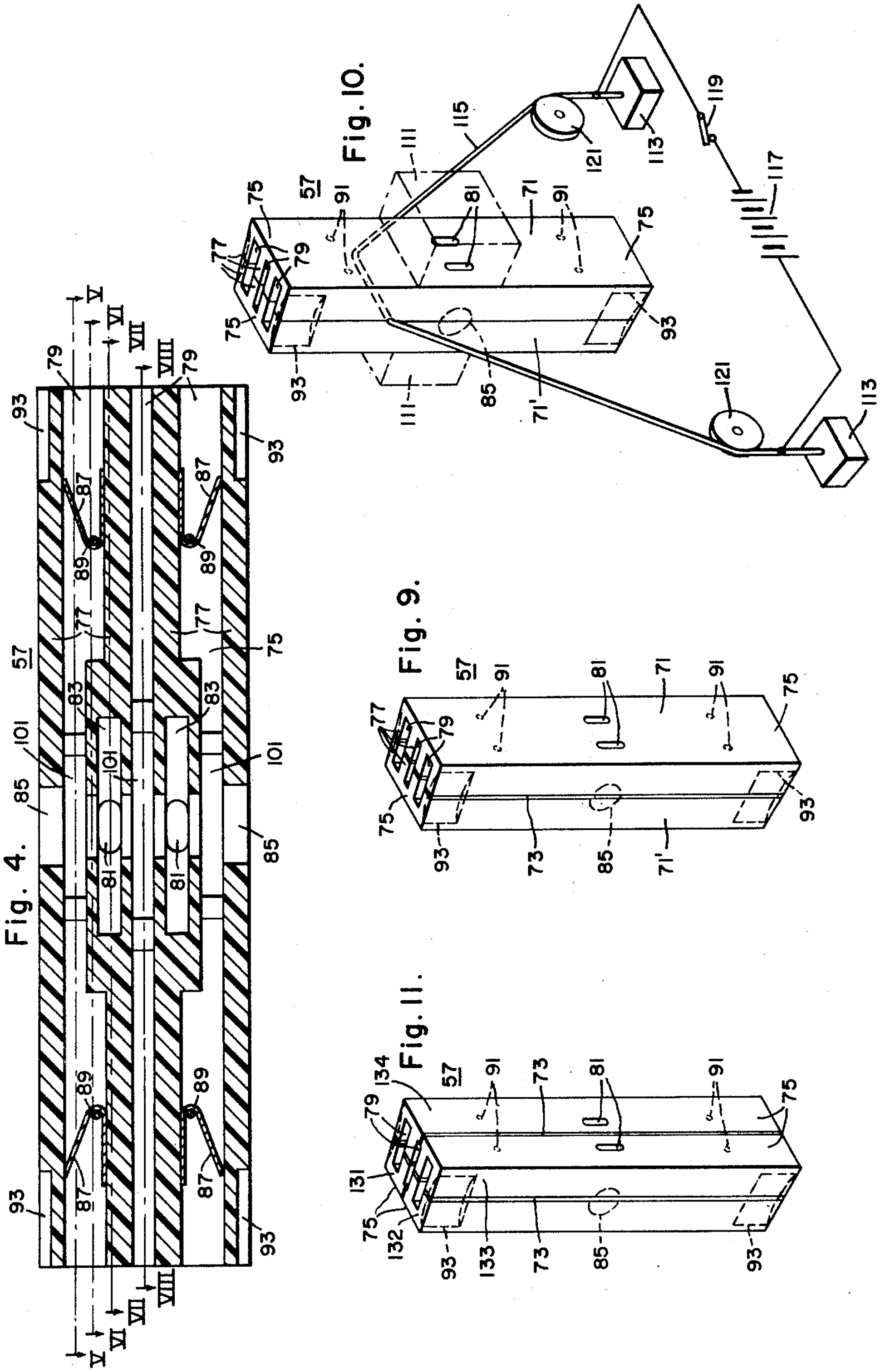
FIG. 4 is a vertical sectional view taken substantially along the line IV—IV of FIG. 3.
FIG. 9 is a perspective view, on a reduced scale, of one of the arc-extinguishing units; the two parts of which have been cemented together to form the unit.
FIG. 10 is a perspective view, on a reduced scale, illustrating a method of bonding the two parts of the arc-extinguishing unit of the invention.
FIG. 11 is a perspective, on a reduced scale, illustrating a four-part arc-extinguishing unit of the invention.

Referring to FIGS. 3–10, the grid block or arc-extinguishing unit 57 is formed of two halves 71 and 71' which are secured together in a manner to be hereinafter specifically described. Each of the halves 71 and 71' of the arc-extinguishing unit 57 comprises a molded body composed of a high molecular weight polyoxymethylene. Each of the halves 71 and 71' includes a side wall 75 and a plurality of barriers 77 which barriers abut to form a plurality of elongated lateral venting passages 79 extending lengthwise through the unit. The barriers 77 and the side walls 75 are also shaped to form two inlet passages 81 that extend widthwise through the unit. The inlet passages 81, FIGS. 4 and 7, each lead into a pocket 83 to be later described. A contact passage 85, shown in dotted lines in FIGS. 9 and 10 and in full lines in FIGS. 3, 4 and 6, is drilled through the arc-extinguishing unit after the halves 71 and 71' have been bonded together. The unit 57 is shown in FIGS. 9 and 10 prior to this drilling operation, and in FIGS. 3–8 subsequent to this operation. After the two halves 71 and 71' are bonded together, four metallic valve members 87, FIG. 4, are pushed back into the upper and lower venting passages 79, and valve retaining pins 89 are inserted through openings 91, shown in broken lines in FIGS. 9 and 10, which are drilled in the unit. The valve pins 89 are cemented or welded in place.

Four grooves 93, shown in full lines in FIG. 4 and in dotted lines in FIGS. 9 and 10, are machined into the unit 57. These grooves cooperate with an insulating clamping plate 95 (FIG. 1) which is rotatably mounted on an insulating bolt 97. By rotating the clamping plates 95, there being two associated with each arc-extinguishing unit 6, the entire interrupting units 57 may be removed from side openings in each of the units 6 to permit inspection of the units and they may be reinserted upside down if desired to provide extended life with a new set of orifices adjacent the stationary contacts 36 (FIG. 2). The clamping plate is more specifically described in the aforementioned patent to Friedrich Patent No. 2,900,478.

When relatively high values of current are interrupted, the pressure established by the arc which is drawn interiorly within the contact passage 85 of each arc-extinguishing unit 57 will be considerable and may prevent downward movement of the piston 55 (FIG. 2). This pressure, in each case, will react upon the fluid or oil which completely fills the unit 6, and will force oil and arcing products laterally outwardly from the centrally disposed contact passage 85, FIG. 4, through the venting passages 79 and out of the unit 6 (FIG. 1).

Following extinction of the arc, the pressure will subside, and the piston 55 will then move downwardly, being carried by the annular spring base 58, to force a flushing flow of oil out of the openings 53, through the inlet passages 81, FIGS. 3 and 4, and also through the end contact openings 85 of the interrupting unit 57, the latter being larger than the diameter of the movable contact 43 (FIG. 2). Thus, this flushing flow of liquid will pass into the arc-extinguishing unit 57 through the foregoing openings and out of the same through the lateral venting passages 79 to the region exteriorly of the unit 6 (FIG. 1). Following the time of high arcing pressure and subsequent downward pumping travel of the piston 55, the valve means 26, FIG. 2, open under the bias of the springs 23 to permit a flow of liquid into the unit 6. During this operation, hot oil and gases escape and the unit 6 is supplied with relatively fresh oil for a subsequent opening operation. The completely open-circuit position of the movable contact 43 is indicated by broken lines in FIG. 2, in which position the contact discs 44 (FIG. 2) of both of the units 6 (FIG. 1), rest upon the inwardly extending flange portions 64, FIG. 2, associated with the contact guides 62.

During the interruption of relatively low values of load current, the pressure established by the arc itself may be low and reliance must then be had upon the pumping action of the piston 55. As before, pumping motion of the piston 55 will force liquid from the region 56 out through the openings 53 and into the grid block or interrupting unit 57 by way of the inlet passages 81 and also through the contact openings 85. This forced flow of oil will strike the arc and effect the extinction thereof within the arcing or contact passage 85. Following extinction of the arc, and following completion of the pumping travel of the piston 55, the valves 26 (FIG. 2) will again open to provide a flow of liquid into the unit 6 in the same manner hereinbefore described.

To close the interrupter, suitable means effects upward travel of the lift rod 8 (FIG. 1) which correspondingly causes upward movement of the conducting bridging cross-bar 7 with its contact tips 61. The latter strike the contact discs 44 and move the same upwardly to effect contact closure, while at the same time charging the several compression springs 45, 59 and 60 (FIG. 2).

The internal configuration of the arc-extinguishing unit 57 is shown more clearly in FIGS. 3–8. In addition to the pockets 83, FIGS. 4 and 7, which are provided in the inlet passages 81, there are provided pockets 101, FIGS. 4, 5 and 8, in the venting passages 79. The pockets 83 and 101 serve to retain additional fluid adjacent the arc. As shown in FIG. 5, the upper and lower venting passages 79 have restricted portions 103 formed therein, and the central venting passage 79 (FIG. 8) has a further restricted portion 105 therein which restrictions function to assist in holding the pressure within the arcing passage 85 during arc interruption, and which provide free circulation of oil for cooling the contacts when the contacts are in the closed current carrying position.

The use of the metallic valves 87 provides variable vent openings which are responsive to the internal pressure present within the arc-extinguishing unit 57. Actually, one or more of the metallic valves 87 may be employed together, depending upon the desired force to effect opening thereof. That is, it may be desirable to provide certain interrupting units with valves which will open with more difficulty than the valve members of other interrupting units.

In addition to improving ventilation, leaving free the central venting passage 79 (FIG. 4) by utilizing spring valve members 87 in only the upper and lower venting passages 79, has another advantage. During low current interruption, fluid flow is caused by the piston action, and the valves 87 either remain closed, or they open only partially. The oil and gas are restricted in passing out of the unit 57 at the upper and lower venting passages 79, and are compelled to pass vertically along the vertical arcing passage 85 to be exhausted out at the central freely opened venting passage 79. Low current interruption has been found to be enhanced by such a construction. A further advantage is that dielectric conditions are improved by the omission of the metallic valve members 87 from the central venting passage 79, which omission increases the space between adjacent valve members 87.

Figure 8:
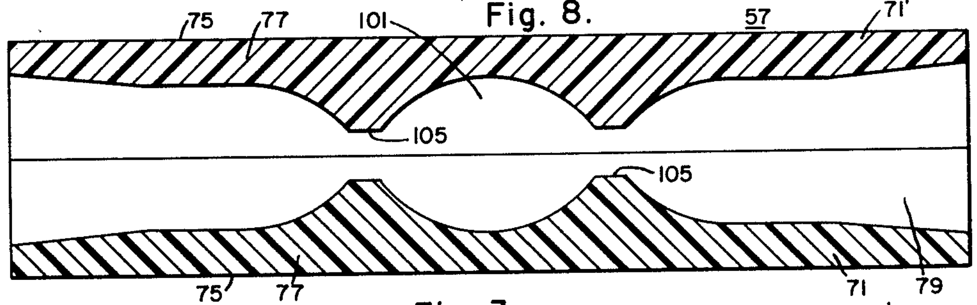

As shown in FIG. 8, the middle or central venting passage 79 is considerably restricted by the barriers 105 to compensate for the omission of valve action. A still further advantage is that replacement of fresh fluid along the arcing passage 85 in the closed position of the interrupter is facilitated by leaving the central venting passage 79 open. Although this venting valve construction is deemed desirable, for certain applications it may be desirable to utilize the metallic valve members 87 in each of the venting passages 79.

The high molecular weight polyoxymethylenes of this invention are disclosed fully in U.S. Patent No. 2,768,994, and in the hereinbefore mentioned U.S. application Serial No. 838,332 filed September 4, 1959. These polymers are defined therein as either having a minimum of toughness retention, defined as a "degree of toughness" of at least one, or having a minimum thermal stability, defined as a reaction rate constant for thermal degradation at 222° C., of less than 1% by weight of the polymer per minute.

These polyoxymethylenes may be prepared in several ways. One satisfactory process for preparing the high molecular weight polyoxymethylenes consist of passing a continuous stream, consisting essentially of monomeric formaldehyde in a concentration of at least 99.5% formaldehyde, into contact with a two component polymerization reaction medium. Said medium consist of (1), a liquid hydrocarbon having from 3 to 10 carbon atoms per molecule. The hydrocarbon may be selected from the group consisting of aliphatic hyrocarbons, cycloaliphatic hydrocarbons, and aromatic hydrocarbons. The second ingredient of the polymerization reaction medium is (2) a catalytic amount of a compound selected from the group consisting of primary, secondary, and tertiary aliphatic amines; primary, secondary, and tertiary cycloaliphatic amines; and primary aromatic amines. The resultant mixture of formaldehyde and polymerization reaction medium is continuously agitated at a temperature within the range of from about −50° C. to about +70° C. at substantially atmospheric pressure. The polymeric particles formed comprise high molecular weight polyoxymethylene.

The high molecular weight polyoxymethylenes are thermoplastic in nature and, therefore, will melt when heated to substantially high temperatures. In cases where melting and softening is found to be undesirable, thermosetting resins may be incorporated with the high molecular polyoxymethylene in amounts up to about 30% by weight. Examples of suitable thermosetting resins which may be so incorporated include polyester resins, epoxy resins, silicon resins, and the like. The high molecular weight polyoxymethylene polymers, either alone or in combination with the thermosetting resins, may be molded conveniently or extruded in the form of tubes, bars, tapes, and the like. The finished molded polymer may be readily machined to any predetermined shape.

The high molecular weight polyoxymethylene polymers of this invention are unique in that they contain no carbon-carbon bonds. Nearly all other known organic polymers contain at least one or more carbon-carbon bonds in a portion of the recurring structural unit. Compounds which contain a carbon-carbon linkage generally carbonize and result in tracking. Since carbon-carbon linkage is absent from the polymers of this invention, these polymers do not carbonize or track and are particularly well suited for use as arc- and track-resistant resinous materials.

Under the influence of an electric arc, formaldehyde present in the polymer decomposes to form carbon monoxide gas and hydrogen gas. Evolution of hydrogen gas during arcing is particularly desirable since hydrogen assists materially in quenching and extinguishing the electric arc due to its high diffusivity and consequent rapid deionization as the alternating current approaches zero value. Thus the arc space rapidly loses its conductivity and the arc is extinguished at the following current zero.

Because of the above mentioned properties and characteristics, high molecular weight polyoxymethylene polymers are particularly suitable for use in arc and track resistant molding compounds as well as various rubber compounds. Unlike hard vulcanized fiber, the polymers can readily be molded by conventional injection molding procedures into intricate and complex shapes, so that the intricate interrupting units hereinbefore described can be formed economically from as few as two molded parts. The high molecular weight polymers of the present invention exhibit excellent dimensional stability as a function of humidity. Thus, the polymers absorb very little moisture. These polymers are particularly suitable materials for circuit interrupters because they are non-hygroscopic and do not warp. These polymers possess outstanding mechanical properties and will withstand the pressures developed by the gas generated during arc extinction in confined chambers.

As shown in FIG. 9, the interrupting unit 57 is formed by establishing a bond between the two halves 71′ and 71 by means of a suitable cement 73.

Another method of forming the interrupting block 57, is shown in FIG. 10. The two molded halves 71 and 71′ are clamped together by a vise or any suitable means. In this instance, two blocks are shown in broken lines at 111 representing means of applying pressure to force the parts 71 and 71′ together. Two insulating weights 113 are attached at opposite ends of a conducting wire 115, which wire carries a current originating from a battery or other suitable means 117. The circuit is controlled by means of a switch 119. The wire 115 is guided by means of two pulleys 121 which are stationarily supported by suitable means. The two halves 71 and 71′ are engaged with their barriers 77 abutting, and the electrically heated wire 115 is forced down between the contacting surfaces by means of the weights 113. The current flowing through the wire generates enough heat to melt the adjacent surfaces of the high molecular weight polyoxymethylene and, since the pieces are forced together by the pressure applying means 111, the melted material flows around the wire 115 and forms a bond or weld. Sound welds are ensured by using well mated surfaces and by maintaining sufficient pressure throughout the operation.

After the parts 71 and 71′ are bonded together, the contact opening 85 is drilled through the unit, and the grooves 93 are machined therein. The openings 91 are drilled in the unit 57, and the valve members 87 are then inserted through the passages 79. The pins 89 are then placed into position and cemented or welded in place to secure the valve members 87 within the unit.

Although the unit was specifically described as being formed from two symmetrical halves, it can be understood that the unit could also be formed from various shaped parts. For instance, one of the parts could comprise merely one of the side walls, and the other part could comprise the other side wall molded integral with the complete barriers. The parts could be bonded together with the barriers of the one part abutting against the other part which is one of the side walls.

It is to be understood also that the interrupting unit could be formed from more than two parts. For example, the unit 57 could be formed from four corner sections 131, 132, 133 and 134, as seen in FIG. 11, bonded together by means of a suitable cement 73, or by the hot-wire welding method previously described.

From the foregoing description, it can be understood that an arc-extinguishing unit is provided comprising a plurality of sections molded in such a way that the intricate unit can be formed from as few as two parts. The parts are bonded together by means of cement, or by the hot wire welding method. The ease of molding and assembly, along with the extremely good electrical insulating and arc-extinguishing properties, and also the outstanding mechanical properties of the high molecular weight polyoxymethylene polymers, enable the construction of the improved arc-extinguishing unit of this invention.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A fluid-type circuit interrupter comprising, in combination, an arc-extinguishing unit immersed in an arc-extinguishing fluid, contact means comprising relatively movable contact members separable to establish an arc within the arc-extinguishing unit, the arc-extinguishing unit comprising two sections, each of said sections comprising a molded insulating member, each of said sections comprising a wall and a plurality of barriers formed integral with and extending generally normal to the wall, said sections being bonded together as a unit with said barriers abutting to form a plurality of generally parallel elongated venting passages in the unit, the points of engagement between said abutting barriers being disposed generally in a single plane, one of said sections being disposed entirely on one side of said plane, the other of said sections being disposed entirely on the other side of said plane, and the bond between said sections being formed by pressing the sections together and pasing a heated wire-type member between the contacting surfaces of the pressing the sections together and passing a heated wire- 2. A fluid-type circuit interrupter comprising, in combination, an arc-extinguishing unit immersed in an arc-extinguishing fluid, contact means comprising relatively movable contact members separable to establish an arc within the arc-extinguishing unit, the arc-extinguishing unit comprising two sections, each of said sections comprising a molded insulating member composed essentially of a high molecular weight polyoxymethylene, each of said sections comprising a wall and a plurality of barriers formed integral with and extending generally normal to the wall, said sections being bonded together as a unit with said barrier abutting to form a plurality of generally parallel elongated venting passages in the unit, the points of engagement between said abutting barriers being disposed generally in a single plane, one of said sections being disposed entirely on one side of said plane, the other of said sections being disposed entirely on the other side of said plane, and the bond between said sections being formed by pressing the sections together and passing a heated wire-type member between the contacting surfaces of the pressed sections to thereby weld the sections together.

References Cited in the file of this patent

UNITED STATES PATENTS

| | | |
|---|---|---|
| 2,505,647 | Norris | Apr. 25, 1950 |
| 2,671,144 | Dickinson | Mar. 2, 1954 |
| 2,759,524 | Davis | Aug. 21, 1956 |
| 2,900,478 | Friedrich | Aug. 18, 1959 |
| 3,059,081 | Gainer et al. | Oct. 16, 1962 |